Dec. 2, 1930. J. W. LESLIE 1,783,247
STRAPPING JOINT
Filed Oct. 22, 1928 2 Sheets-Sheet 1

Inventor:
John W. Leslie
By Williams, Bradbury, McCaleb & Hinkle
Attys

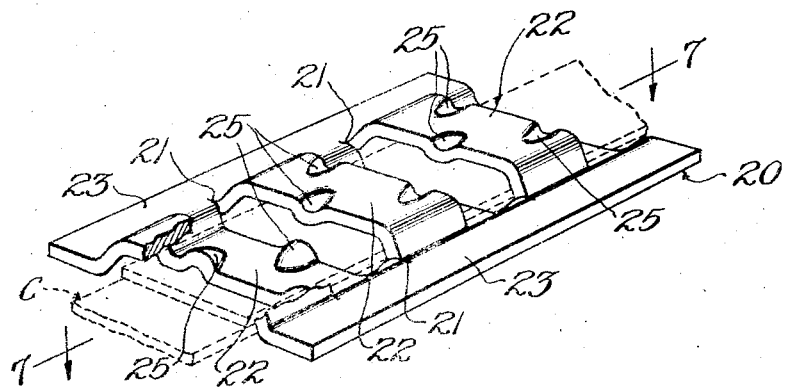
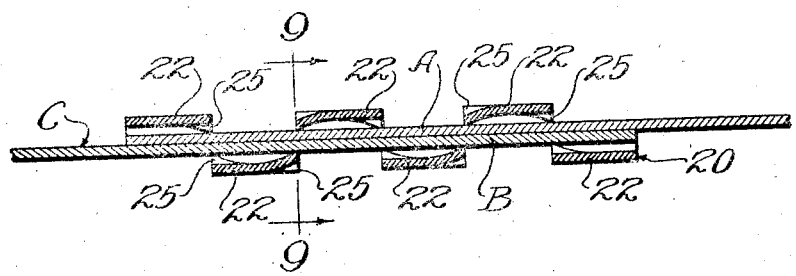
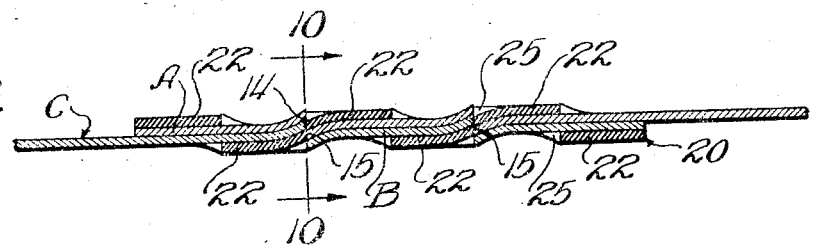
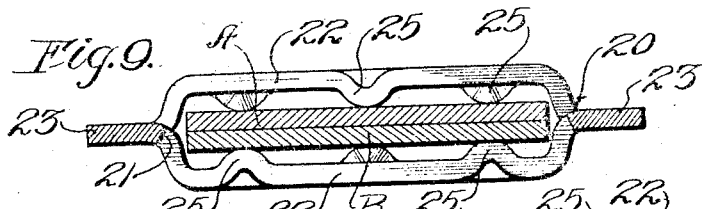
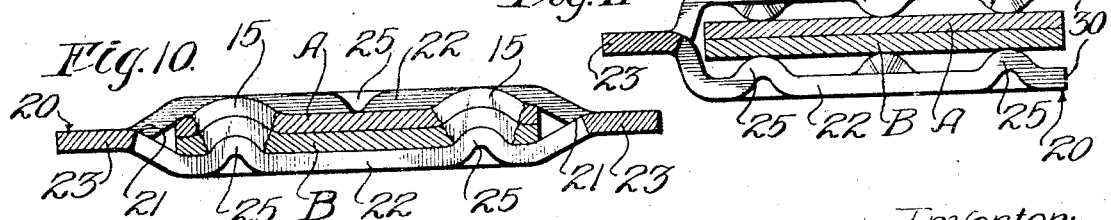

Patented Dec. 2, 1930

1,783,247

UNITED STATES PATENT OFFICE

JOHN W. LESLIE, OF EVANSTON, ILLINOIS, ASSIGNOR, BY MESNE ASSIGNMENTS, TO SIGNODE STEEL STRAPPING COMPANY, A CORPORATION OF DELAWARE

STRAPPING JOINT

Application filed October 22, 1928. Serial No. 314,216.

My invention relates to strapping joints and particularly to seal-joints, especially adapted for metal strapping such as used in the banding of boxes, bales, barrels and other types of merchandise packages. With the types of seal-joints heretofore in common use it has been necessary to provide relatively intense deformations, which strain and often fracture the strapping, or to deform a relatively large area of the strapping. Such intense deformation greatly weakens the tensile strength of the strapping at the point where the joint is formed.

One of the objects of my invention is to provide an improved seal-joint for metal strapping.

Another object is to provide a seal-joint in which high joint strength is procured without greatly reducing the tensile strength of the strapping at the joint.

Another object is to provide a seal-joint wherein the sleeve is initially opened at one side and so constructed as to overlap itself and be completely wrapped about the strap ends upon the closing of the press for forming the indentations comprising a part of the joint.

A further object is to provide a seal-joint that is extremely flat and is only slightly greater in thickness than the overlapped band ends. This feature is of importance where a plurality of thin strapped bundles are laid upon one another.

Another object is to provide a seal-joint wherein the sleeve forming a part of the joint is applied to the strap ends by edgewise movement and wherein the sleeve is so constructed as to initially restrict the ends against relative lateral movement.

Another object is to provide a seal-joint that is simple, reliable, inexpensive and readily produced.

Other objects and advantages will hereinafter appear.

An embodiment of my invention is illustrated in the accompanying drawings wherein.

Figs. 6 to 10 inclusive, illustrate a modified form of my improved seal-joint, of which Fig. 7 is a sectional view along the line 7—7 of Fig. 6;

Fig. 8 is a sectional view similar to Fig. 7 but showing the parts after the joint is completed.

Fig. 9 is a sectional view along the line 9—9 of Fig. 7;

Fig. 10 is a sectional view along the line 10—10 of Fig. 8; and

Fig. 11 is a sectional view of another modification of the seal-joint.

The seal-joint is applied to the opposite and overlapped ends A and B of flat steel strapping C previously bound about package D.

Figure 4:
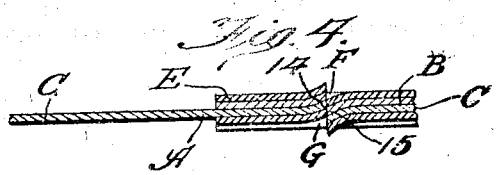
Fig. 4 is a sectional view along the line 4—4 of Fig. 2.

In general, the seal-joint consists in a sleeve E encircling the overlapped ends A and B of the strapping C and indentations F and G formed in opposite sides of sleeve E and strapping ends respectively and arranged in pairs in endwise alignment as best shown in Fig. 4.

Figure 5:
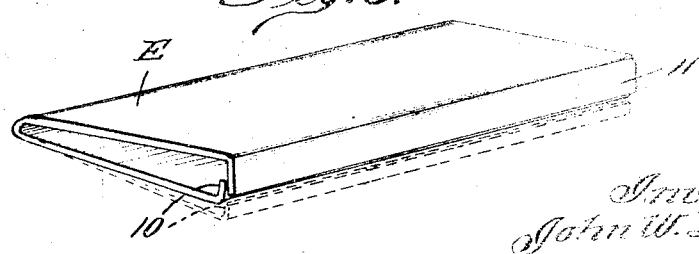
Fig. 5 is a perspective view of the sleeve forming a part of the seal-joint.

With reference to Fig. 5, sleeve E is formed of a single piece of metal folded back upon itself and having one edge upturned at 10 a distance slightly less than twice the thickness of strapping C. The edge 10 functions to prevent relative lateral movement between the strap ends both before and after the sleeve has been closed about the strapping. The opposite edge is turned downwardly at 11. Sleeve E is initially formed with its sides spread in the position shown in dotted lines in Fig. 5 so that the sleeve may be moved laterally over overlapped strapping ends A and B.

Figure 3:
Fig. 3 is a sectional view along the line 3—3 of Fig. 2.

In forming the seal-joint the sides of sleeve E are pressed close to the strapping and edge 11 of sleeve E is thereupon bent laterally at 12 so as to partially overlie the under surface 13 of the sleeve (see Fig. 3), thus locking the sleeve about the strapping. Indentations F and G are thereupon formed in opposite sides respectively of sleeve E and band ends A and B and the joint is thus completed.

These indentations are arranged in pairs and each taper away from one another so that the deepest parts are juxtaposed, forming abutting edges 14 and 15 of the strap ends A and B respectively.

The pairs of indentations F and G have their longitudinal axes parallel with the longitudinal axis of strapping C. In thus arranging indentations F and G I have provided a joint in which abutting and oppositely disposed parts of bands A and B serve to prevent longitudinal movement of the strapping ends apart from one another and in which each of the abutting parts is reinforced by the semi-conical, longitudinally aligned portions 16 formed by the indentations.

I have reduced the transverse cross-sectional mutilation of the joint to a minimum by causing distortion of the overlapping strap ends in opposite directions away from the normal plane of the strapping so that a relatively small distortion of the metal provides relatively strong and extensive abutting faces. Heretofore joints of this type have been formed by distortion of the metal in one direction only from the normal plane of the strapping.

The function of sleeve E is to maintain the opposed faces of strapping ends A and B in tight engagement with one another and to further increase interlocking metal portions of the joint as the distorted sleeve portions act in the same manner as do the distorted strap portions to form abutting faces coacting to resist tensile stresses.

In Figs. 6 to 10 inclusive, I have illustrated a modification of the seal-joint in which the indentations in strapping are produced by the protrusions formed in the inner walls of the sleeve which bear upon the strapping as pressure is applied to the opposite faces of the sleeve. With reference to Fig. 6, the sleeve comprises a heavy metal plate 20 which is slitted transversely at 21 to provide a plurality of parallel straps 22 secured together at their ends by opposite marginal portions 23 of the plate. Alternate strap portions 22 are bent upwardly from the plane of the plate and the remaining strap portions bent downwardly, so that the overlapped ends of strapping C may be threaded therebetween as indicated in Fig. 7.

Figure 1:
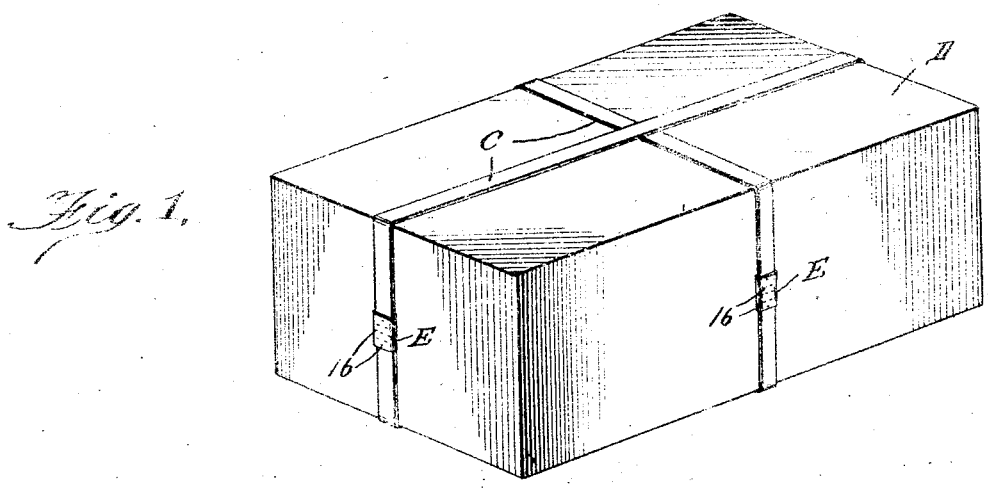
Fig. 1 is a perspective view of a package in the form of a box showing the application of strapping with my seal-joint.
Figure 2:
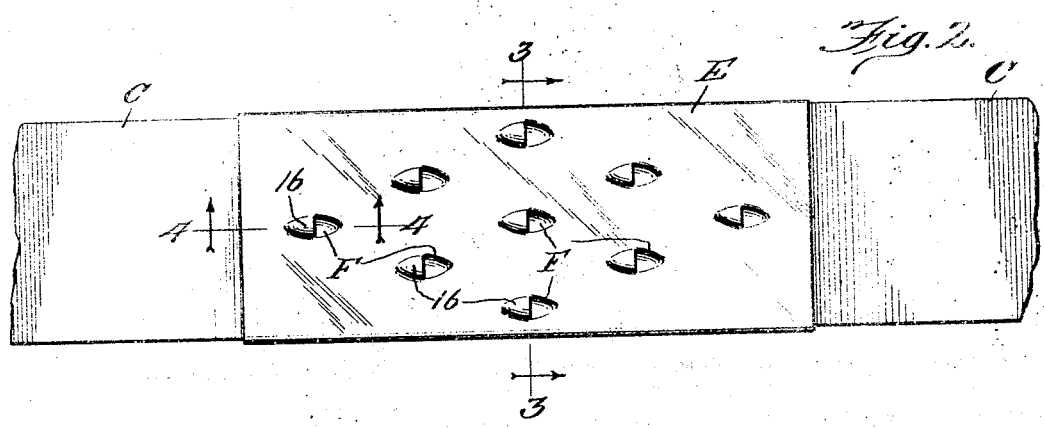
Fig. 2 is an enlarged plan view of my improved seal-joint.

Pre-formed semi-conical protrusions 25 are struck inwardly in the strap portions 22, the protrusions of adjacent strap portions cooperating to form indentations identical to the indentations (see Fig. 2) in strapping C when the sleeve is compressed as shown in Fig. 8.

In Figs. 9 and 10 I have illustrated the changes in form of the strapping which occur when the sleeve is compressed, i. e. alternate and oppositely extended strap portions 22 forced toward one another. It will be seen that deformation of the strapping C is identical in Figs. 10 and 3.

A seal-joint formed as described, eliminates the necessity of having special dies for forming the indentations wherever such seals are to be produced. Any type of press which is capable of pressing the sleeve may be used to form the joint, thus greatly reducing the cost of equipment in the field.

From a comparison of Figs. 4 and 8 it will be seen that the seal as produced by the sleeve 20 resists longitudinal stresses in the same manner. The protrusions 25 shear the strapping C to form abutting shoulders 14 and 15 of the ends A and B of the strapping.

Also, as in the case of seal-joint illustrated in Figs. 1 to 5, the joint formed by sleeve 20 reduces the cross-sectional mutilation of the strapping to a minimum, principally because some portions of the strapping are stretched out of the normal plane of the strapping in opposite directions to co-operate in forming the seal, whereas in prior seal-joints the strapping stretched in but one direction away from the normal plane of the strap.

In Fig. 11 I have illustrated another modified form of the seal-joint identical to that form illustrated in Figs. 6 to 10 inclusive, except that sleeve 20 is opened at one side 30 to permit the sleeve to be placed over the strapping by lateral movement. In all other respects the seal-joint is formed and operates precisely as in the case of the last described joint.

Obviously, the form of the sleeve 20 and the shape of the opposed indentations may be varied to conform with the various special uses to which the joint may be placed.

A joint so constructed maintains the highest degree of tensile strength without sacrifice of joint strength.

While I have herein illustrated and described a preferred form of my invention, it is to be understood that I am not limited to the exact embodiment set forth.

What I claim is:

1. A joint for connecting overlapping portions of metal strap, comprising a metal sleeve embracing said overlapped portions, and a pair of indentations extending in opposite directions through the sleeve and overlapped portions of strap, said indentations having oppositely disposed relatively abrupt shoulders therebetween.

2. A joint for interconnecting overlapping juxtaposed portions of metal strap, comprising a metallic sleeve embracing said overlapping strap portions, and a pair of indentations formed from opposite sides of the sleeve into the sleeve and overlapped portions of strap, said indentations tapering in opposite directions to relatively abrupt shoulders that abut each other.

3. A tension-resisting joint for connecting together overlapped portions of tensioned package strapping, comprising a metal sleeve placed about and tightly clamping together the overlapped portions of the strapping, and a series of indentations arranged in pairs on opposite sides of and extending into the sleeve and overlapped portions of strapping, said indentations of each pair having oppositely disposed relatively abrupt shoulders transverse to the direction of the tension in the adjacent portions of strap and being longer along their longitudinal axes than along their transverse axes.

4. A tension-resisting joint for connecting together overlapped portions of tensioned package strapping, comprising a metal sleeve placed about and clamping together the overlapped portions of the strapping, and a series of indentations arranged in pairs on opposite sides of and extending into the sleeve and overlapped portions of strapping, the indentations of each pair arranged in longitudinal alignment and having oppositely disposed, relatively abrupt shoulders transverse to the direction of the tension in the adjacent strap portions.

5. A tension-resisting joint for connecting together overlapped portions of tensioned package strapping, comprising a metal sleeve placed about and clamping together the overlapped portions of the strapping, and a series of indentations arranged in pairs on opposite sides of and extending into the sleeve and overlapped portions of strapping and having their longitudinal axes parallel to the longitudinal axis of the strapping, said indentations of each pair having oppositely disposed relatively abrupt shoulders.

6. A joint for connecting overlapping portions of metal strap, comprising a metal sleeve embracing said overlapped portions, and a pair of indentations extending in opposite direction through the sleeve and overlapped portions of strap, said indentations having oppositely disposed relatively abrupt shoulders and tapering away from the shoulders to form semi-conical reinforcing portions for the shoulders, said indentations being longer along their longitudinal axes than along their transverse axes.

7. In a joint for interlocking overlapping strap ends, a metal sleeve having one side opened for edgewise application of the sleeve to said strap ends, one edge of the sleeve being extended and adapted to be wrapped about the opposite edge and face to maintain the sleeve closed, the opposite edge of the sleeve being bent inwardly to confine the strap ends against relative lateral movement.

8. A joint for interconnecting overlapping portions of a metal strap comprising a metal member embracing said overlapped strap portions and a pair of indentations in said strapping extending in opposite directions from the normal plane of the strapping to present oppositely disposed relatively abrupt shoulders cooperating to prevent longitudinal movement of the overlapped strap ends, said metal member having parts registering with said indentations, and extending laterally across each opposed indentation of a pair.

9. A point for interconnecting overlapping portions of a metal strap comprising a metal member engaging with the overlapped strap portions and a pair of indentations formed in said overlapped strap ends from opposite sides thereof to present relatively abrupt shoulders that abut each other, said metal member having parts conforming in contour to said indentations and registering therewith, and extending laterally across each opposed indentation of a pair.

10. A joint for interconnecting overlapping portions of a metal strap comprising a pair of indentations formed in the overlapped portions of the strap and extending in opposite directions away from the normal plane of the strap to present relatively abrupt oppositely disposed shoulders, and a metal member embracing said overlapped portion provided with rigid protrusions for forming said indentations when the member is tightly pressed into engagement with the strap ends.

11. A tension resisting joint for over-lapped strap ends comprising a retaining sleeve enveloping the over-lapped ends and a multiplicity of tension resisting deformations vertically formed in the superposed strap ends and sleeve, the deformations being laterally and longitudinally spaced and also being spaced inwardly from the lateral margins.

12. A tension resisting joint for line overlapped strap ends comprising in combination therewith a sleeve enveloping the over-lapped strap ends, a multiplicity of tension resisting deformations impressed both upwardly and downwardly in said superposed layers and longitudinally and transversely spaced.

13. A joint for interconnecting over-lapping juxtaposed portions of metal strap, comprising a metallic sleeve embracing said overlapping strap portions, and a multiplicity of indentations formed from opposite sides of the sleeve into the sleeve and over-lapping portions of strap, said indentations tapering in opposite directions to relatively abrupt shoulders that abut each other, said indentations being spaced longitudinally and transversely.

14. A joint for connecting over-lapping portions of metallic strap, comprising a metal sleeve embracing said over-lapping portions, and a pair of indentations spaced inwardly from the lateral margins and extending in opposite directions through the sleeve and overlapping portions of strap, said indentations having oppositely disposed relatively abrupt shoulders therebetween.

15. A joint for interconnecting over-lapping juxtaposed portions of metal strap comprising a pair of longitudinally elongated indentations formed from opposite sides in the over-lapped portions of strap, said indentations tapering in opposite directions to relatively abrupt shoulders that abut each other.

In witness whereof, I hereunto subscribe my name this 17th day of October, 1928.

JOHN W. LESLIE.